US010831654B2

(12) United States Patent
Li et al.

(10) Patent No.: US 10,831,654 B2
(45) Date of Patent: Nov. 10, 2020

(54) CACHE MANAGEMENT USING MULTIPLE CACHE HISTORY LISTS

(71) Applicant: EMC IP Holding Company LLC, Hopkinton, MA (US)

(72) Inventors: Liam Xiongcheng Li, Beijing (CN); Xinlei Xu, Beijing (CN); Lifeng Yang, Beijing (CN); Changyu Feng, Beijing (CN); Ruiyong Jia, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 175 days.

(21) Appl. No.: 16/021,597

(22) Filed: Jun. 28, 2018

(65) Prior Publication Data

US 2019/0004946 A1 Jan. 3, 2019

(30) Foreign Application Priority Data

Jun. 30, 2017 (CN) .......................... 2017 1 0523416

(51) Int. Cl.
*G06F 12/0802* (2016.01)
*G06F 12/0871* (2016.01)
*G06F 12/0855* (2016.01)
*G06F 12/0806* (2016.01)

(52) U.S. Cl.
CPC ...... *G06F 12/0802* (2013.01); *G06F 12/0806* (2013.01); *G06F 12/0857* (2013.01); *G06F 12/0871* (2013.01); *G06F 2212/1021* (2013.01); *G06F 2212/262* (2013.01); *G06F 2212/284* (2013.01); *G06F 2212/312* (2013.01); *G06F 2212/461* (2013.01); *G06F 2212/466* (2013.01); *G06F 2212/608* (2013.01)

(58) Field of Classification Search
CPC ............ G06F 12/0802; G06F 12/0806; G06F 12/0857; G06F 12/0871; G06F 12/0884; G06F 2212/1021; G06F 2212/262; G06F 2212/284; G06F 2212/312; G06F 2212/461; G06F 2212/466; G06F 2212/608
See application file for complete search history.

(56) References Cited

U.S. PATENT DOCUMENTS

| 5,732,253 | A | 3/1998 | McMahan |
| 6,484,242 | B2 | 11/2002 | Hosoya et al. |
| 6,609,177 | B1 | 8/2003 | Schlumberger et al. |
| 6,810,474 | B1 | 10/2004 | Miki |
| 7,808,975 | B2 | 10/2010 | Narayanaswami et al. |
| 8,107,463 | B2 | 1/2012 | Narayanaswami et al. |

(Continued)

*Primary Examiner* — Aracelis Ruiz
(74) *Attorney, Agent, or Firm* — BainwoodHuang

(57) ABSTRACT

Embodiments of the present disclosure relate to a method and device for cache management. The method includes: receiving an I/O request associated with a processor kernel; in response to first data that the I/O request is targeted for being missed in a cache, determining whether a first target address of the first data is recorded in one of a plurality of cache history lists; in response to the first target address not being recorded in the plurality of cache history lists, storing, in a first node of a first free cache history list, the first target address and an initial access count of the first target address, the first free cache history list being determined in association with the processor kernel in advance; and adding the first node to a first cache history list associated with the I/O request of the plurality of cache history lists.

17 Claims, 8 Drawing Sheets

(56) References Cited

U.S. PATENT DOCUMENTS

| | | |
|---|---|---|
| 8,291,169 B2 | 10/2012 | Luick |
| 8,332,587 B2 | 12/2012 | Luick |
| 8,429,350 B2 | 4/2013 | Luick |
| 8,949,529 B2 | 2/2015 | Bellows et al. |
| 2017/0124000 A1* | 5/2017 | Ash ................ G06F 12/123 |

* cited by examiner

CACHE MANAGEMENT USING MULTIPLE CACHE HISTORY LISTS

RELATED APPLICATIONS

This application claim priority from Chinese Patent Application Number CN 201710523416.5, filed on Jun. 30, 2017 at the State Intellectual Property Office, China, titled "METHOD AND DEVICE FOR CACHE MANAGEMENT" the contents of which is herein incorporated by reference in its entirety.

FIELD

Embodiments of the present disclosure generally relate to the field of data storage, and more specifically, to a method, device and computer program product for cache management.

BACKGROUND

With the development of data storage technology, various data storage devices have been able to provide the user with increasingly higher data storage capability, and data access speed has also been improved greatly. While data storage capability is improved, the user has also raised increasing demands for higher data reliability and quicker response time of the storage system.

Currently, it is often determined through a cache history list whether data is hot enough to be written into the cache. The system may receive a plurality of concurrent I/O requests at one time, and when the data that the I/O request is targeted for is missed in the cache, each I/O request needs to access the cache history list. Further, each access needs to lock the cache history list, making it impossible to perform a plurality of I/O requests concurrently, thus impacting the cache efficiency. Therefore, how to solve access conflictions of a plurality of I/O requests for the history list to improve the degree of concurrency becomes a focus.

SUMMARY

Embodiments of the present disclose provide a scheme for cache management.

In accordance with a first aspect of the present disclosure, there is provided a method for cache management, comprising: receiving an I/O request associated with a processor kernel; in response to first data that the I/O request is targeted for being missed in a cache, determining whether a first target address of the first data is recorded in one of a plurality of cache history lists; in response to the first target address not being recorded in the plurality of cache history lists, storing, in a first node of a first free cache history list, the first target address and an initial access count of the first target address, the first free cache history list being determined in association with the processor kernel in advance; and adding the first node to a first cache history list associated with the I/O request of the plurality of cache history lists.

In accordance with a second aspect of the present disclosure, there is provided a cache manager, comprising: at least one processing unit; and at least one memory coupled to the at least one processing unit and storing instructions executed by the at least one processing unit, the instructions, when executed by the at least one processing unit, causing the device to implement acts. The acts include: receiving an I/O request associated with a processor kernel; in response to data that the I/O request is targeted for being missed in a cache, determining whether a first target address of the data is recorded in one of a plurality of cache history lists; in response to the first target address not being recorded in the plurality of cache history lists, storing, in a first node of a first free cache history list, the first target address and an initial access count of the first target address, the first free cache history list being determined in association with the processor kernel in advance; and adding the first node to a first cache history list associated with the I/O request of the plurality of cache history lists.

In a third aspect, there is provided a computer program product tangibly stored on a non-transient computer-readable medium and comprising computer-executable instructions, and the computer-executable instructions, when executed, cause the computer to implement any step of the method according to the first aspect of the present disclosure.

BRIEF DESCRIPTION OF THE DRAWINGS

The above and other objectives, features, and advantages of example embodiments of the present disclosure will become more apparent from the following detailed description with reference to the accompanying drawings, wherein the identical reference sign refers to the identical elements in the example embodiments of the present disclosure.

DETAILED DESCRIPTION OF EMBODIMENTS

Figure 1:
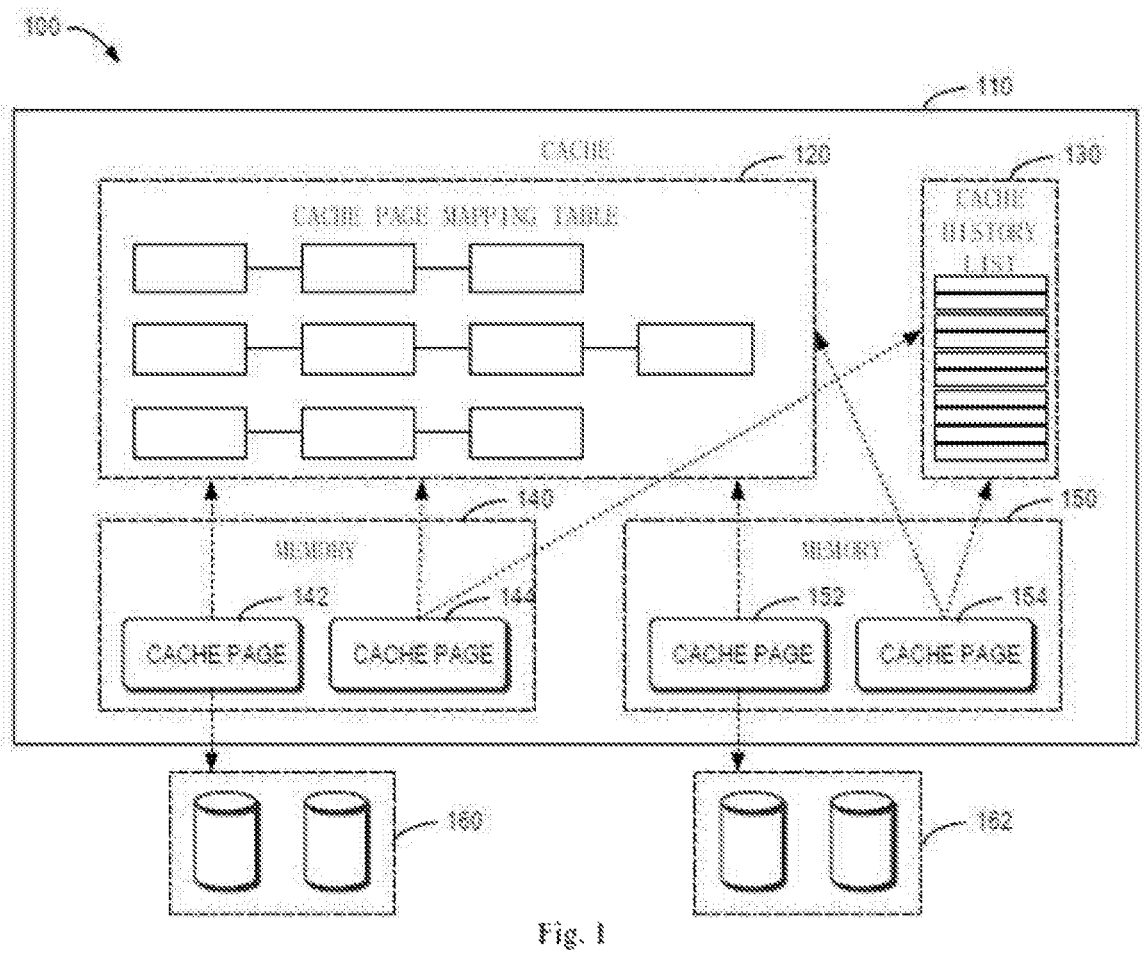
FIG. 1 is a schematic diagram illustrating a traditional cache management system.

Example embodiments of the present disclosure will be described in the following in greater detail with reference to the drawings. Although preferred embodiments of the present disclosure are displayed in the drawings, it is to be understood that the present disclosure can be implemented in various manners, not limited to the embodiments illustrated herein. On the contrary, these embodiments are provided to make the present disclosure more thorough and complete and convey the scope of the present disclosure completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." Terms "first," "second" and others can denote different or identical objects. The following text may also contain other explicit or implicit definitions.

As stated above, there are conflictions for a cache history list in traditional cache management. FIG. 1 is a schematic diagram illustrating a traditional cache management system architecture 100. As shown in FIG. 1, a cache management system 100 may include a cache 110 and a plurality of redundant array of independent disks RAIDs (RAID 160 and RAID 162). The cache 110 may include a cache page mapping table 120, a cache history list 130 and a plurality of memories (memory 140 and memory 150). The memory 140 may include a cache page 142 for recording data written from RAID 160 into cache memory 140 and a history page 144 for recording the number of times for which each address has been accessed in RAID 160. The cache page mapping table 120 stores the mapping between the cache page 142 and the addresses in RAID 160, and the cache history list 130 organizes information of all the history pages (history page 144, history page 154 and so on) in the cache into a list for cache management.

Figure 2A:
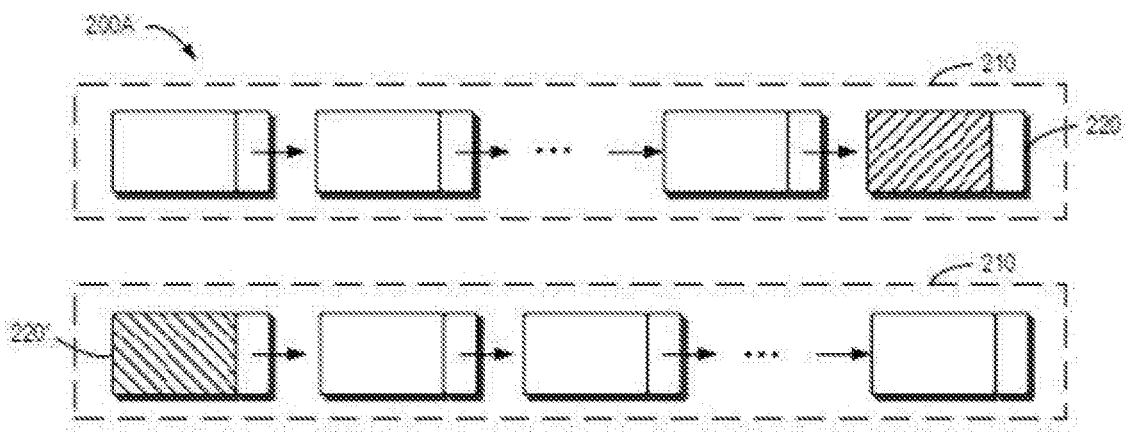
FIG. 2 is a schematic diagram illustrating a traditional updating process of a cache history list.
Figure 2B:
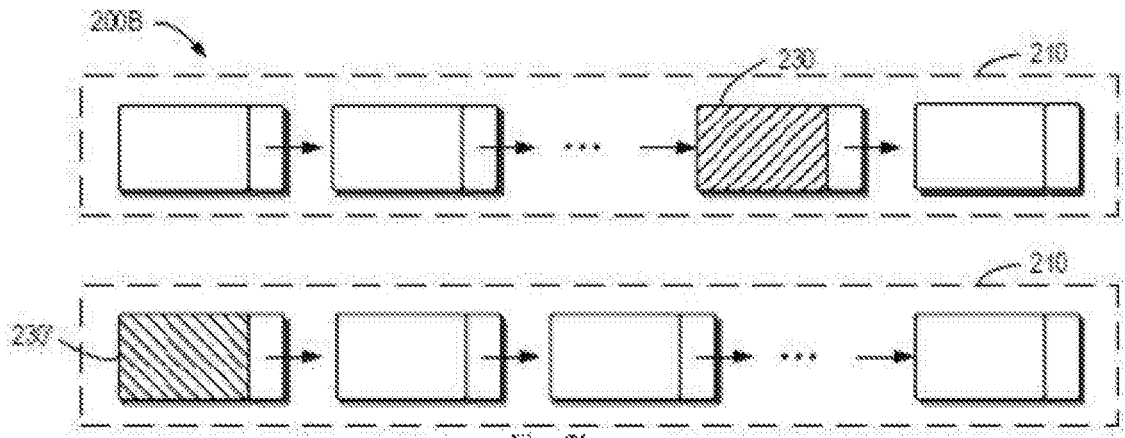

When the data that a plurality of I/O requests received by the system are targeted for is missed in the cache 110, each I/O request needs to access and lock the cache history list 130. In this matter, access conflictions between a plurality of I/O requests are caused, thus affecting the performance of the system. Meanwhile, the traditional updating of the cache history list is very complex. FIGS. 2a-2b illustrate a schematic diagram 200 of an updating process of a cache history list based on a traditional cache system architecture.

As shown in FIG. 2a, if the data that an I/O request is targeted for is missed in a cache 110 and the target address which the I/O request is targeted for is not cached in a history list 210, the target address that the I/O request is targeted for and the initial count information is written in a tail node 220 of the cache history list 210, and the updated node 220' is further moved to the head of the cache history list 210. As shown in FIG. 2b, if the data that the I/O request is targeted for is missed in the cache 110 and the target address that the I/O request is targeted for is recorded in the node 230 of the cache history list 210, the access count recorded in the node 230 may be updated, and the updated node 230' is moved to the head of the cache history list 210. As this updating process requires looking up for the tail node of the list, updating information and moving the node to the head, it generally takes a longer time for operation.

Embodiments of the present disclosure provide a scheme for cache management. In accordance with various example embodiments of the present disclosure, a single cache history list in the traditional scheme is divided into a plurality of cache history lists. Each I/O request may be mapped to the corresponding cache history list based on particular mapping rule. In this way, concurrency of a plurality of I/O requests is enabled. Meanwhile, it is also possible to configure in advance a plurality of free cache history lists in each kernel. When the target address that the I/O request is targeted for is not stored in the cache list, the system may obtain free nodes from the free cache history list and add them to the corresponding cache history list.

With the cache management mechanism, the cache system may support concurrent access to the cache history list by a plurality of I/O requests. Besides, free nodes are obtained directly from the free cache history list, thus shortening the time for allocating free nodes. In this matter, the conflictions existing in the traditional cache management are decreased and the response time of the system is shortened.

Example embodiments of cache management according to embodiments of the present disclosure will be described below in detail with reference to FIGS. 3-7.

Figure 3:
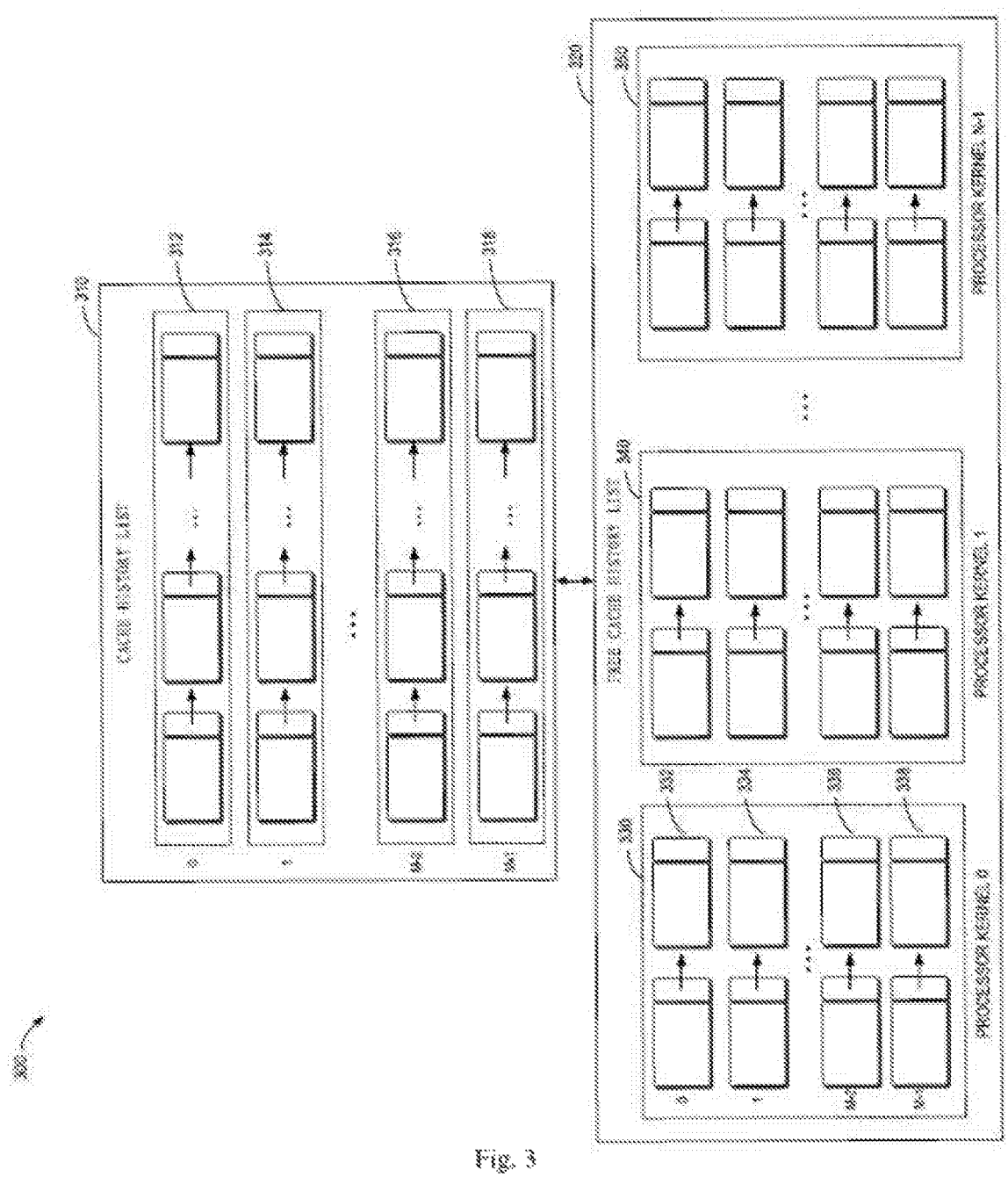
FIG. 3 is a schematic diagram illustrating a cache management architecture in accordance with embodiments of the present disclosure.

FIG. 3 is a schematic diagram illustrating a cache management architecture 300 in accordance with embodiments of the present disclosure. As shown in FIG. 3, the cache management architecture 300 includes M cache history lists 312-318 and a plurality of free cache history list groups 330-350 which are associated with each of N processor kernels in advance. Each free cache history list group (such as free cache history list group 330) includes M free cache history lists 332-338 corresponding to M cache history lists 312-318. In some embodiments, to allocate I/O requests more evenly to different free cache history lists, a prime number (such as 127) of cache history lists may be constructed so as to ensure load balances of cache history lists. Based on this cache management architecture, the cache can support concurrent execution of at most M different I/O requests.

Figure 4:
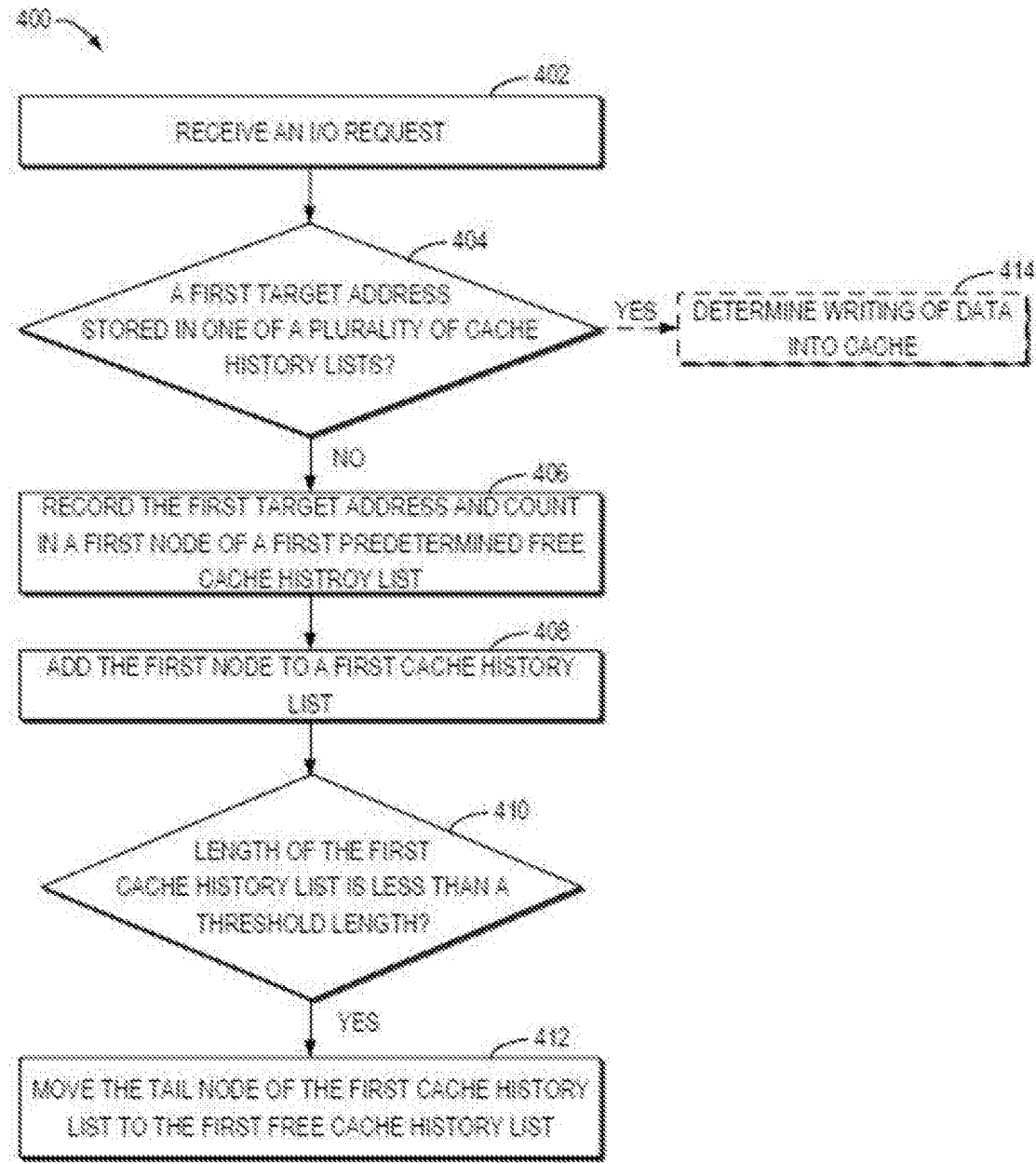
FIG. 4 is a flowchart illustrating a method for cache management in accordance with embodiments of the present disclosure.

FIG. 4 is a flowchart illustrating a cache management method 400 based on the cache management architecture shown in FIG. 3. At block 402, the system receives an I/O request associated with a processor kernel. In some embodiments, for instance, the system may obtain a serial number of the processor kernel which runs the thread for executing the I/O request.

At block 404, in response to the data which the I/O request is targeted for being missed in the cache, it is determined whether a first target address that the I/O request is targeted for is recorded in one of the plurality of cache history lists. If yes, method 400 proceeds to block 414, that is, determine writing of the data into cache, which process will be depicted below in detail with reference to FIG. 5. Otherwise, method 400 proceeds to block 406.

At block 406, the first target address and the initial access count thereof are stored in a first node of the first free cache history list, the first free cache history list being determined in association with the processor kernel in advance. As shown in FIG. 3, the processor kernel 0 is associated with a plurality of free cache history lists 332-338 in advance, and each of the free cache history lists 332-338 may include one or more free nodes.

In some embodiments, for each address page, a unique identifier value may be determined based on equation (1)

$$\text{Key}=(\text{FLU\#}<<48)\&(\text{Starting LBA}>>7) \qquad (1)$$

where Key indicates the identifier value of the address; FLU# indicates the serial number of the logic unit corresponding to the address; and Starting LBA indicates the starting address of the address page.

Based on the above identifier value Key, it is possible to correspond, based on equation (2) through modular arithmetic, each address page to the respective cache history list and/or free cache history list of the processor kernel.

$$i=((\text{Key}\&0x\textit{ffffffff})+(\text{Key}>>33)*0x8000)\bmod M \qquad (2)$$

where i represents the serial number of the cache history list and/or free cache history list of the processor kernel. On the basis of the modular arithmetic of equation (2), it is possible to allocate different address pages evenly to each cache history list and free cache history list, and an I/O request is then associated with a specific cache history list and free cache history list. It should be known that this association mechanism and the constants used therein are only illustrative, and those skilled in the art may establish association between the address page and cache history list and free cache history list through other mechanisms.

Figure 6:
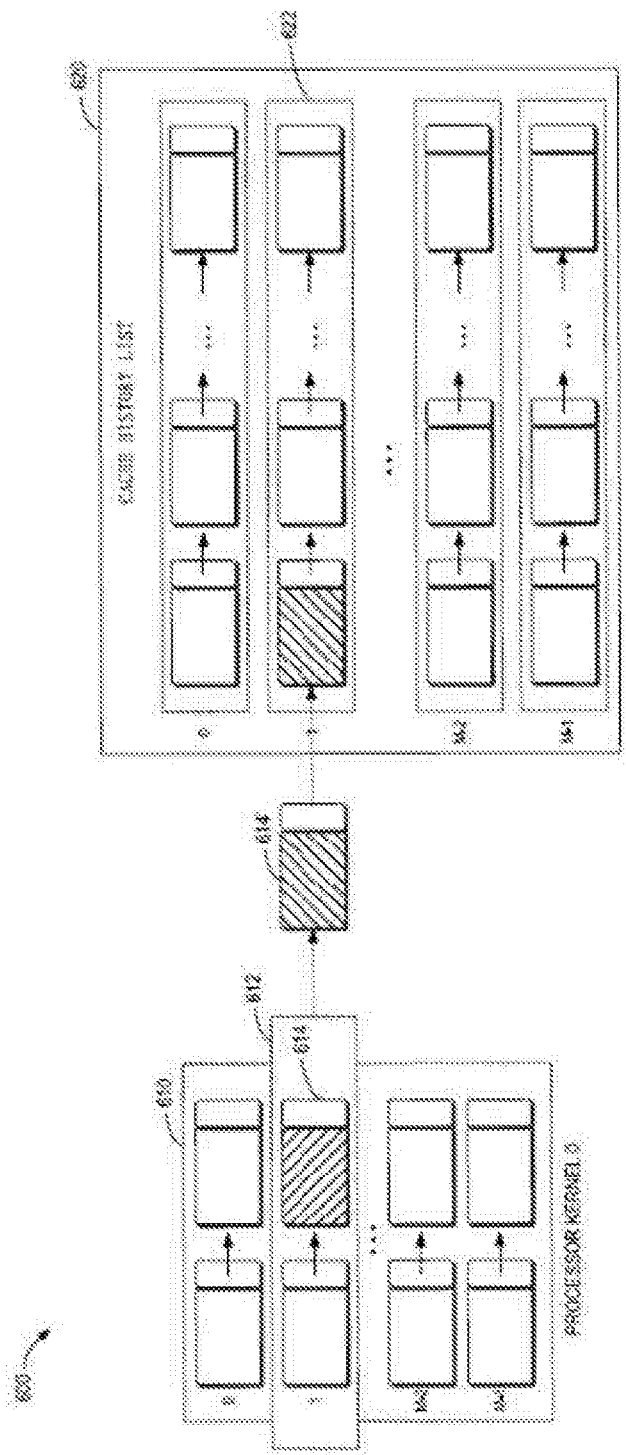
FIG. 6 is a schematic diagram of allocating a node in accordance with embodiments of the present disclosure.

FIG. 6 is a schematic diagram illustrating allocation of a node in method 400 in accordance with embodiments of the present disclosure. In the example shown in FIG. 6, the I/O request is associated with the processor kernel 0 and meanwhile, the first target address that the I/O request is targeted for is associated with the cache history list 622 with serial number 1 and a free cache history list 612 in the processor kernel 0. Therefore, the system may obtain a free node 614 from the free cache history list 612. The system may then write the first target address that the I/O request is targeted for and the initial count (for example, 1) into the node 614 to obtain an updated node 614'. Through this manner of obtaining free node, it is not necessary for the system to lock the free history list as compared with the traditional scheme, thereby enabling a plurality of I/O requests to obtain free nodes concurrently and improving the response efficiency of the system Still referring to FIG. 4, at block 408, the first node is added to the first cache history list. As illustrated in FIG. 6, the updated node 614' is added to the head of the first cache history list 622.

Besides, for supporting a plurality of I/O requests to apply for free nodes simultaneously, in some embodiments, at block 410, the system may further determine that the length of the first free cache history list is less than a threshold length. If yes, method 400 proceeds to block 412, that is, the tail node of the first cache history list is moved to the first free cache history list. For example, as shown in FIG. 6, the threshold length may be set as 2. When the node 614 is allocated, the length of the free cache history list 612 is 1, namely, less than the threshold length. Then, it is possible to move the tail node of the cache history list 622 to the free cache history list 612, such that there are sufficient free nodes in the free cache history list for supporting concurrency. In some embodiments, a plurality of (for example, the threshold number minus the existing number) tail nodes may be obtained.

Figure 5:
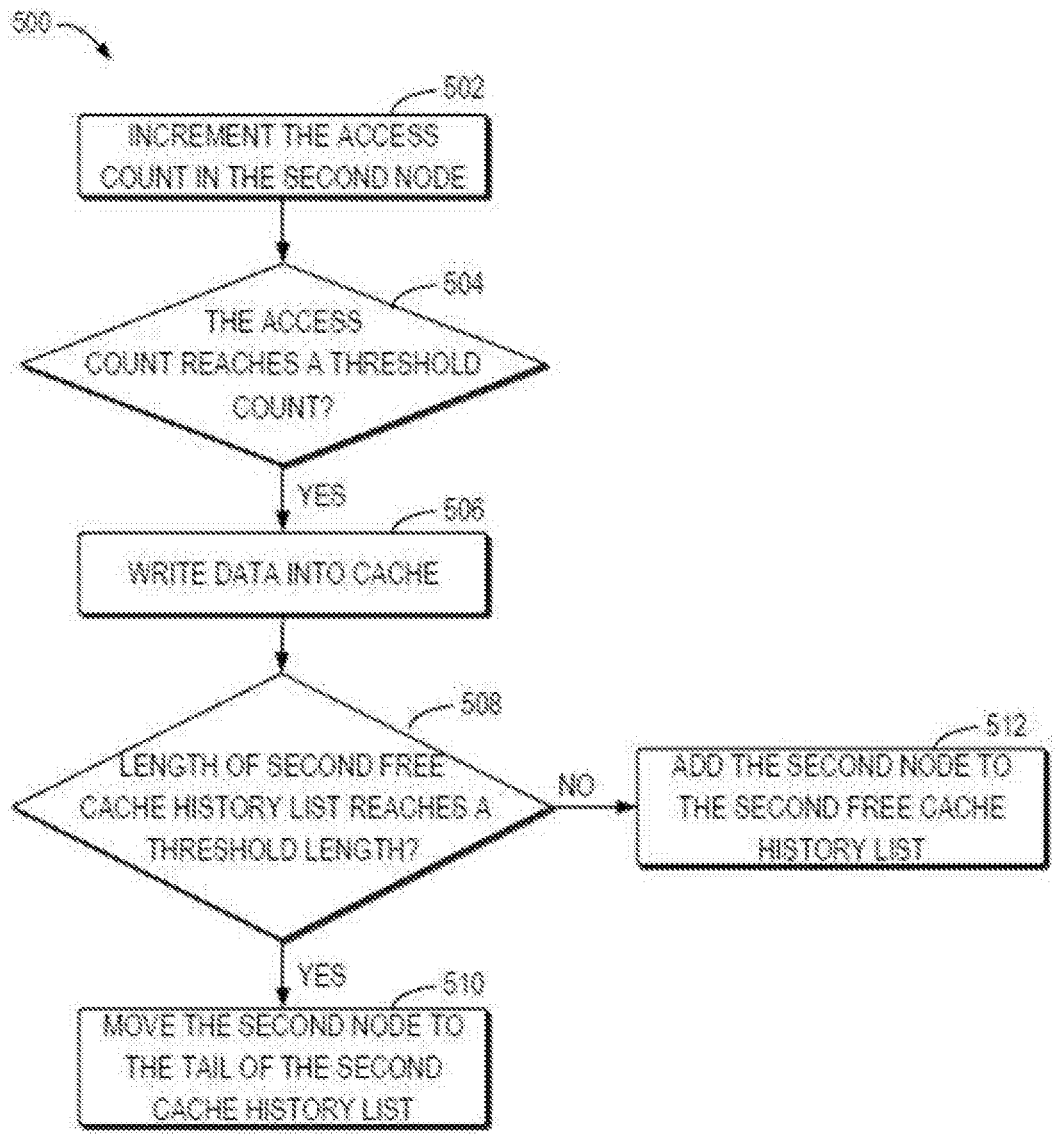
FIG. 5 is a flowchart illustrating a method for determining writing of data into cache in accordance with embodiments of the present disclosure.
Figure 7:
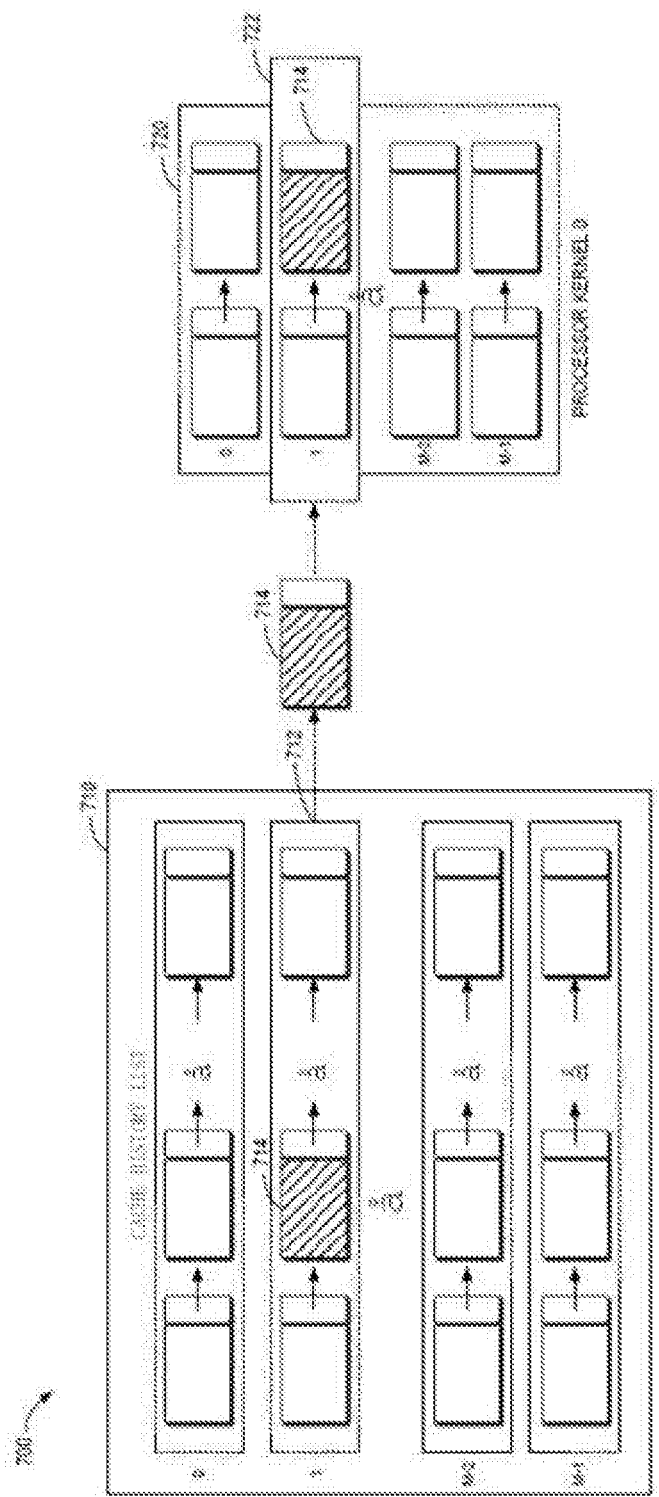
FIG. 7 is a schematic diagram of releasing a node in accordance with embodiments of the present disclosure.

A processing mechanism for a target address that is not recorded in the cache history list is depicted above in detail with reference to FIGS. 4 and 6. The process of determining writing of data into cache depicted in block 414 of FIG. 4 will be described below in detail with reference to FIGS. 5 and 7. FIG. 5 is a flowchart illustrating a method 500 for determining writing of data into cache in accordance with embodiments of the present disclosure and FIG. 7 is a schematic diagram 700 of releasing a node in accordance with embodiments of the present disclosure.

At block 502, in response to the first target address being recorded in a second cache history list, the access count stored in the second node associated with the first target address in the second cache history list is incremented. As shown in FIG. 7, if the first target address that the I/O request is targeted for is recorded in the second node 714 of the cache history list 712, the access count recorded in the second node 714 may be incremented.

At block 504, it is determined whether the access count reaches a predetermined threshold count. If yes, the method 500 proceeds to block 506 in which data in the address recorded in the second node are written into the cache. In some embodiments, for example, the threshold count may be set as 3, that is, if the address has been accessed for three times recently, data in the address may be written into the cache.

At block 508, it is determined whether the length of a second free history list associated with the second node reaches a threshold length. If so, method 500 proceeds to block 510, that is, the second node is moved to the tail of the second cache history list. Otherwise, method 500 proceeds to block 512, that is, the second node is added to the second free cache history list.

Figure 8:
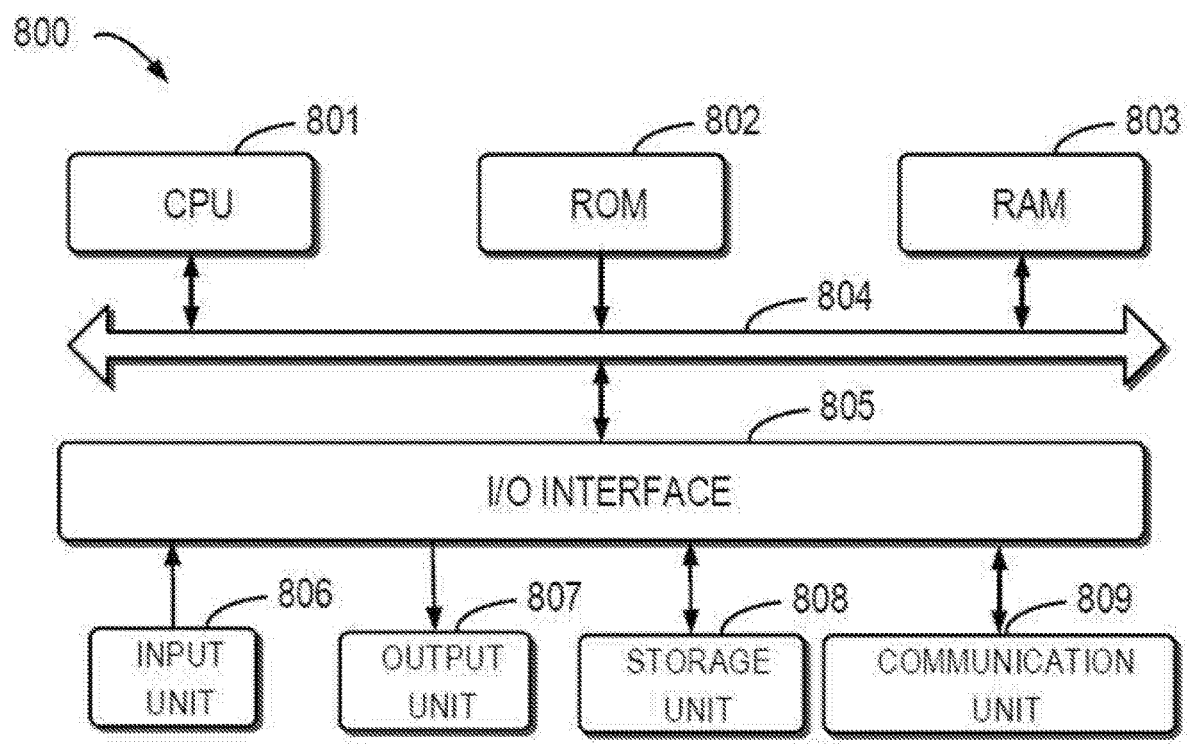
FIG. 8 is a schematic block diagram illustrating an example device that can be used to implement embodiments of the present disclosure.

As shown in FIG. 7, after data of the address recorded in the second node 714 are written into the cache, a second free history list associated with the second node 714 may be obtained. In some embodiments, a corresponding free history list may be obtained based on the serial number of the processor kernel of the I/O request, and the serial number of the free history list corresponding to the address recorded in the node determined based on equation (2). For instance, in the example shown in FIG. 7, the free cache history list corresponding to the second node 714 is the free cache history list 722 in the processor kernel 0. To prevent the length of the free history list from increasing continuously and ensuring that the cache history list has sufficient length to record access information, a threshold length (such as 4) for the free cache history list may be configured. When the length is exceeded, no new nodes would be added to the free cache history list any more. For example, when the length of the second free cache history list 722 has reached the threshold length 4, node 714 will be moved directly to the tail of the second cache history list 712 (not shown in the figure). If the length of the second free cache history list 722 is less than the threshold length 4, then the node 714 will be added to the second free cache history list 722 shown in FIG. 7. By configuring an upper limit threshold and a lower limit threshold for the free cache history list, a plurality of I/O requests are supported to apply for free nodes concurrently and the cache history list also has a sufficient length to record access information within a sufficiently long period of time, achieving a balance between degree of concurrency and recording validity. FIG. 8 is a schematic block diagram of an example apparatus that can be used to implement embodiments of the present disclosure.

As shown in FIG. 8, the apparatus 800 comprises a central processing unit (CPU) 801 which is capable of performing various processes in accordance with computer program instructions stored in a read only memory (ROM) 802 or computer program instructions loaded from a storage unit 808 to a random access memory (RAM) 803. In the RAM 803 are stored various programs and data as required by operation of the apparatus 800. The CPU 801, the ROM 802 and the RAM 803 are connected to one another via a bus 804. An input/output (I/O) interface 806 is also connected to the bus 804.

The following components in the device 800 are connected to the I/O interface 805: an input unit 806 including a keyboard, a mouse, or the like; an output unit 807 such as various types of displays and speakers; the storage unit 808 such as a magnetic disk or optical disk; and a communication unit 809 such as a network card, a modem, a wireless communication transceiver or the like. The communication unit 809 allows the device 800 to exchange information/data with other devices through a computer network such as the Internet and/or various types of telecommunication networks.

The processing unit 801 performs various method and processes described above, for example methods 400. For example, in some embodiments, the method 400 may be implemented as a computer software program or computer program product, which is tangibly contained in a machine-readable medium, for example the storage unit 808. In some embodiments, part or all of the computer program may be loaded and/or installed on the device 800 via ROM 802 and/or communication unit 809. When the computer program is loaded in the RAM 803 and executed by CPU 801, one or more acts of the method 400 described above may be executed.

The present disclosure may be a method, an apparatus, a system and/or a computer program product. The computer program product may include a computer readable storage medium (or media) having computer readable program instructions thereon for causing a processor to perform aspects of the present disclosure.

The computer readable storage medium may be a tangible device that may retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. Non-exhaustive and more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other electromagnetic waves propagating freely, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processing unit of the computer or other programmable data processing apparatus, create means for implementing the functions/actions specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or actions, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for cache management, comprising:
   receiving an I/O request associated with a processor kernel;
      in response to first data that the I/O request is targeted for being missed in a cache, determining whether a first target address of the first data is recorded in one of a plurality of cache history lists;
      in response to the first target address not being recorded in the plurality of cache history lists, storing, in a first node of a first free cache history list, the first target address and an initial access count of the first target address, the first free cache history list being determined in association with the processor kernel in advance;
      adding the first node to a first cache history list associated with the I/O request of the plurality of cache history lists;
      in response to the first target address being recorded in a second cache history list of the plurality of cache history lists, incrementing an access count stored in a second node associated with the first target address of the second cache history list; and
      moving the second node to a head of the second cache history list.

2. The method according to claim 1, further comprising:
   determining whether a length of the first free cache history list is less than a predetermined threshold length; and
   in response to the length being less than the predetermined threshold length, moving a tail node of the first cache history list to the first free cache history list.

3. The method according to claim 1, further comprising:
   determining whether the access count reaches a predetermined threshold count; and
   in response to the access count reaching the predetermined threshold count, writing the first data in the first target address recorded in the second node into the cache.

4. The method according to claim 3, further comprising:
   in response to writing the first data into the cache, releasing the second node from the second cache history list.

5. The method according to claim 4, the releasing comprising:
   determining whether a length of a second free cache history list associated with the second node reaches a predetermined threshold length; and
   in response to the length reaching the predetermined threshold length, moving the second node to the tail of the second cache history list.

6. The method according to claim 5, further comprising:
   in response to the length being less than the predetermined threshold length, moving the second node to the second free cache history list.

7. A cache manager, comprising:
   at least one processing unit;
   at least one memory coupled to the at least one processing unit and storing instructions executed by the at least one processing unit, the instructions, when executed by the at least one processing unit, causing the device to implement acts, including:
      receiving an I/O request associated with a processor kernel;
      in response to data that the I/O request is targeted for being missed in a cache, determining whether a first target address of the data is recorded in one of a plurality of cache history lists;
      in response to the first target address not being recorded in the plurality of cache history lists, storing, in a first node of a first free cache history list, the first target address and an initial access count of the first target address, the first free cache history list being determined in association with the processor kernel in advance;
      adding the first node to a first cache history list associated with the I/O request of the plurality of cache history lists;
      in response to the first target address being recorded in a second cache history list of the plurality of cache history lists, incrementing an access count stored in a second node associated with the first target address in the second cache history list; and
      moving the second node to a head of the second cache history list.

8. The cache manager according to claim 7, the acts further comprising:
   determining whether a length of the first free cache history list is less than a predetermined threshold length; and
   in response to the length being less than the predetermined threshold length, moving a tail node of the first cache history list to the first free cache history list.

9. The cache manager according to claim 7, the acts further comprising:
   determining whether the access count reaches a predetermined threshold count; and
   in response to the access count reaching the predetermined threshold count, writing data in the first target address recorded in the second node into the cache.

10. The cache manager according to claim 9, the acts further comprising:
    in response to finishing writing the data in the first target address into the cache, releasing the second node from the second cache history list.

11. The cache manager according to claim 10, the acts further comprising:
    determining whether a length of a second free cache history list associated with the second node reaches a predetermined threshold length;
    in response to the length reaching the predetermined threshold length, moving the second node to the tail of the second cache history list.

12. The cache manager according to claim 11, the acts further comprising:
    in response to the length being less than the predetermined threshold length, moving the second node to the second free cache history list.

13. A computer program product for cache management, the computer program product comprising:

a non-transitory computer readable medium encoded with computer-executable code, the code configured to enable the execution of:
  receiving an I/O request associated with a processor kernel;
  in response to first data that the I/O request is targeted for being missed in a cache, determining whether a first target address of the first data is recorded in one of a plurality of cache history lists;
  in response to the first target address not being recorded in the plurality of cache history lists, storing, in a first node of a first free cache history list, the first target address and an initial access count of the first target address, the first free cache history list being determined in association with the processor kernel in advance;
  adding the first node to a first cache history list associated with the I/O request of the plurality of cache history lists;
  in response to the first target address being recorded in a second cache history list of the plurality of cache history lists, incrementing an access count stored in a second node associated with the first target address of the second cache history list; and
  moving the second node to a head of the second cache history list.

14. The computer program product of claim 13, wherein the code is further configured to enable the execution of:
  determining whether a length of the first free cache history list is less than a predetermined threshold length; and
  in response to the length being less than the predetermined threshold length, moving a tail node of the first cache history list to the first free cache history list.

15. The computer program product of claim 13, wherein the code is further configured to enable the execution of:
  determining whether the access count reaches a predetermined threshold count; and
  in response to the access count reaching the predetermined threshold count, writing the first data in the first target address recorded in the second node into the cache.

16. The computer program product of claim 15, wherein the code is further configured to enable the execution of:
  in response to writing the first data into the cache, releasing the second node from the second cache history list.

17. The computer program product of claim 16, the releasing comprising:
  determining whether a length of a second free cache history list associated with the second node reaches a predetermined threshold length; and
  in response to the length reaching the predetermined threshold length, moving the second node to the tail of the second cache history list.

* * * * *